(12) United States Patent
Franklin et al.

(10) Patent No.: US 9,868,856 B2
(45) Date of Patent: Jan. 16, 2018

(54) POLYMER STABILIZERS FOR BITUMINOUS EMULSIONS

(71) Applicant: Akzo Nobel Chemicals International B.V., Arnhem (NL)

(72) Inventors: Ralph Franklin, Danbury, CT (US); Qiong Zhou, Hopewell Junction, NY (US)

(73) Assignee: Akzo Nobel Chemicals International B.V., Arnhem (NL)

( * ) Notice: Subject to any disclaimer, the term of this patent is extended or adjusted under 35 U.S.C. 154(b) by 0 days.

(21) Appl. No.: 15/528,562

(22) PCT Filed: Dec. 2, 2015

(86) PCT No.: PCT/EP2015/078320
§ 371 (c)(1),
(2) Date: May 22, 2017

(87) PCT Pub. No.: WO2016/087498
PCT Pub. Date: Jun. 9, 2016

(65) Prior Publication Data
US 2017/0267865 A1  Sep. 21, 2017

Related U.S. Application Data

(60) Provisional application No. 62/088,227, filed on Dec. 5, 2014.

(30) Foreign Application Priority Data

Jan. 23, 2015 (EP) .................................... 15152236

(51) Int. Cl.
| C08L 95/00 | (2006.01) |
| C08K 3/34 | (2006.01) |
| C08L 79/02 | (2006.01) |
| C09D 179/02 | (2006.01) |
| C08G 73/02 | (2006.01) |
| C09J 179/02 | (2006.01) |

(52) U.S. Cl.
CPC .......... *C08L 95/005* (2013.01); *C08G 73/022* (2013.01); *C08G 73/0226* (2013.01); *C08K 3/346* (2013.01); *C08L 79/02* (2013.01); *C09D 179/02* (2013.01); *C09J 179/02* (2013.01); *C08L 2555/80* (2013.01)

(58) Field of Classification Search
None
See application file for complete search history.

(56) References Cited

U.S. PATENT DOCUMENTS

| 2,915,476 | A | 12/1959 | Shen |
| 3,539,368 | A | 11/1970 | Timmon et al. |
| 3,783,945 | A * | 1/1974 | Dauben .................. C09K 8/524 |
| | | | 166/305.1 |
| 3,871,893 | A | 3/1975 | Doughty |
| RE28,808 | E * | 5/1976 | Panzer ...................... C02F 1/54 |
| | | | 210/736 |
| 4,387,017 | A | 6/1983 | McEntire et al. |
| 4,393,155 | A | 7/1983 | Garrett, Jr. |
| 4,411,775 | A | 10/1983 | McCoy et al. |
| 4,902,779 | A | 2/1990 | Waldmann |
| 5,045,576 | A | 9/1991 | Roeck et al. |
| 5,928,418 | A | 7/1999 | Tamaki et al. |
| 2004/0170587 | A1 | 9/2004 | Vondruska |
| 2012/0035302 | A1* | 2/2012 | Brocas ................ C04B 20/1037 |
| | | | 524/59 |

FOREIGN PATENT DOCUMENTS

| DE | 199 29 962 A1 | 1/2001 |
| EP | 2 083 050 A1 | 7/2007 |
| WO | 00/21918 A1 | 4/2000 |
| WO | 01/00734 A1 | 1/2001 |

OTHER PUBLICATIONS

Telford Bituminous Materials, p. 33-34, 1994. (Year: 1994).*
"Standard Specification for Emulsified Asphalt," ASTM International D 977-05, pp. 1-3, Published Jul. 2005.
"Standard Specification for Cationic Emulsified Asphalt," ASTM International D 2397-05, pp. 1-3, Published Jul. 2005.
"Standard Test Method for Saybolt Viscosity," ASTM D 88-94, pp. 1-7, Published Nov. 1994, (Reapproved 1999).
"Standard Test Methods and Practices for Emulsified Asphalts," ASTM International D 244-04, pp. 1-13, Published Dec. 2004.
"Standard Test Method for Determining Demulsibility of Emulsified Asphalt," ASTM International D 6936-04, pp. 1-2, Published Aug. 2004.
"Standard Test Method for Penetration of Bituminous Materials," ASTM International D 5-06, pp. 1-4, Published Jun. 2006.
"Standard Test Method for Settlement and Storage Stability of Emulsified Asphalts," ASTM International D 6930-04, pp. 1-2, Published Aug. 2004.
"Standard Test Method for Residue by Evaporation of Emulsified Asphalt," ASTM International D 6934-08, pp. 1-2, Published Jul. 2008.

(Continued)

Primary Examiner — Christopher M Rodd
(74) Attorney, Agent, or Firm — Matthew J. DeRuyter

(57) ABSTRACT

A mineral-compatible cationic emulsion composition with polymer stabilizers, and methods for utilizing same in paving and other applications is disclosed. In one aspect, a bitumen-in-water emulsion composition includes at least one bitumen material, at least one polymer stabilizer, at least one emulsifier, and water, where the emulsifier is a cationic surfactant, an amphoteric surfactant, or a mixture of both, and the polymer stabilizer is a natural or synthetic cationic polymer consisting of alkylene polyamines, alkyl polyamines, polyquaternary polymers, polyvinylamine, polyvinylimidazoline, polyester polyquaternary polymers, polyether polyquaternary polymers, or mixtures thereof. The inclusion of polymer stabilizer in the cationic emulsion increases the stability of the emulsion and increases the compatibility of the cationic emulsion with negatively charged minerals.

12 Claims, No Drawings

(56) References Cited

OTHER PUBLICATIONS

"Standard Test Method for Oversized Particles in Emulsified Asphalts (Sieve Test)," ASTM International D 6933-04, pp. 1-2, Published Aug. 2004.
International Preliminary Report on Patentability for PCT/EP2015/078320 dated Nov. 8, 2016.
European Search Report issued in EP Application No. 15152236.4 dated Jul. 1, 2015.
International Search Report and Written Opinion for PCT/EP2015/078320 dated Feb. 5, 2016.

\* cited by examiner

POLYMER STABILIZERS FOR BITUMINOUS EMULSIONS

This application is a national stage filing under 35 U.S.C. §371 of PCT/EP2015/078320, filed Dec. 2, 2015, which claims priority to U.S. Provisional Patent Application No. 62/088,227 filed Dec. 5, 2014, and European Patent Application No. 15152236.4, filed Jan. 23, 2015, the contents of which are each incorporated herein by reference in their entireties.

BACKGROUND OF THE INVENTION

Oil-in-water emulsions containing bitumen are used in numerous commercial applications such as road construction and repair, as well as in the construction industry as coatings and sealers. Bitumen-in-water emulsions are a specific type of oil-in-water emulsion in which the bitumen material exists as fine particles dispersed in a water phase. These emulsions possess numerous advantages over conventional bitumen compositions. Environmental advantages include reduction in fuel utilization and energy consumption because bitumen emulsions generally do not require hot storage and require hot application. Safety advantages exist because bitumen emulsions are generally water based and are not flammable. Bituminous emulsions also generally have greater versatility and performance than conventional asphalt and therefore can be used in a variety of applications and environmental conditions. There is a continuing need for improvements in bituminous emulsions, and for optimizing such compositions for various applications.

The asphalt properties of bituminous emulsions are obtained after the emulsions set or cure, when the droplets of bitumen coalesce and adhere to the substrate when water is removed. The rate of this setting process depends on the reactivity of the emulsion and the reactivity of the substrate. Emulsions are classified as rapid, medium and slow-setting types, depending on their reactivity. Emulsions can also be classified into cationic or anionic types depending on the charge on the bitumen droplets.

DE 19929962 is in the field of bituminous emulsions and relates to novel emulsifiers for the production of bitumen emulsions and the use of cation polymers as additives for the production of such preparations.

U.S. Pat. No. 3,871,893 relates to the use of lignin amines as surface active agents, especially in cationic asphalt emulsions.

In many cases, it is desirable to incorporate minerals (such as clay, silica or slate, for example) into bituminous emulsions so that the oil residue cured from the resulting emulsions behaves in the manner of nano-composites, which are generally more durable than non-modified residue. These minerals can be incorporated into bituminous emulsions either by initially utilizing mineral stabilized emulsions during formulation, by the post-addition of minerals or a mineral slurry into bituminous emulsions after the emulsions have been formed, or, alternatively, by the incorporation of bitumen materials which can include bitumen modifiers containing minerals. Advantageously, addition of minerals (especially clays) into bituminous emulsions naturally increases the viscosity and improves the storage ability of the resulting emulsions.

Due to the negative surface charge nature of minerals, anionic slow-setting emulsions (which are naturally compatible to minerals) are frequently utilized with mineral substances. Negatively charged minerals generally do not disrupt the negatively charged polar heads of the emulsifiers surrounding the bitumen particles in anionic emulsions. As a result, the addition of negatively charged minerals to anionic emulsions generally does not result in breakage of the emulsions.

The addition of negatively charged minerals to cationic emulsions is generally not possible because the negatively charged minerals can disrupt the positively charged polar heads of the emulsifiers surrounding the bitumen particles in cationic emulsions. As a result, the addition of negatively charged minerals to cationic emulsions frequently result in breakage of the emulsions.

For cationic slow-setting emulsions, quite high cationic emulsifier levels generally are needed for preparation of the cationic slow-setting emulsions, and the active ingredients in the cationic emulsifiers known in the art are generally mixtures of cationic emulsifiers with non-ionic emulsifiers. U.S. Pat. No. 3,539,368, describes incorporating negatively charged fillers in certain cationic emulsions by pretreatment of filler materials with tertiary amine oxides. WO2001000734 discloses the use of amidoamine emulsifiers.

For cationic rapid-setting emulsions, addition of negatively charged minerals is especially problematic. Excessive overdose of the cationic emulsifiers might make the cationic rapid-setting emulsions compatible to minerals, but the overdose of emulsifier will generally change the grade of the emulsions (from fast-setting to slow-setting type, for example).

In some limited cases, minerals or mineral slurries can be post-added into cationic emulsions to form short-stable mineral modified bitumen emulsions. This post-addition of minerals generally must occur after the emulsion has been created. There remains a need of directly formulating stable cationic emulsions with minerals. There is an ongoing need for improved cationic emulsion compositions that contain minerals (and the corresponding benefits of these minerals).

The compositions of the present disclosure increase the stability of cationic emulsions generally by increasing emulsion stability, increasing viscosity, and reducing emulsion particle size. The compositions of the present disclosure also address the problem of directly formulating stable cationic emulsions containing minerals and allows for the direct formulation of stable cationic emulsions, as well as more stable cationic emulsions containing post-added mineral slurries. These and other advantages of the present disclosure, as well as additional inventive features, will be apparent from the description of the inventions provided herein.

SUMMARY OF INVENTION

In one aspect of the present disclosure, a bitumen-in-water emulsion composition includes at least one bitumen material, at least one polymer stabilizer, at least one emulsifier, and water, where the emulsifier is a cationic surfactant, an amphoteric surfactant, a mixture of both, or their mixtures with non-ionic surfactants, and the polymer stabilizer is a natural or synthetic cationic polymer consisting of alkylene polyamines, alkyl polyamines, polyquaternary polymers, polyvinylamine, polyvinylimidazoline, polyester polyquaternary polymers, polyether polyquaternary polymers, or mixtures thereof.

In another aspect, the compositions of the disclosure further comprise mineral materials such as natural or synthetic clay, hydrophobic modified organoclay, talc, lime, cementitious material, silica/silicate, slate, or combinations thereof.

In yet another aspect, an additive mixture of at least one polymer stabilizer and at least one surfactant emulsifier is disclosed.

The present disclosure also generally relates to methods for utilizing the composition in various applications including road paving and maintenance, roofing, bitumen-based adhesives, and bituminous coatings.

DETAILED DESCRIPTION OF THE INVENTION

It has now been found that, surprisingly, the polymer stabilizers of the present disclosure increase stability of bituminous emulsions and create mineral compatibility for cationic bituminous emulsions. One aspect of the present disclosure relates to compositions for cationic bitumen emulsions that are compatible with negatively charged minerals, including extremely water-swelling clays such as montmorillonite.

The cationic emulsion compositions of the present disclosure comprise at least one polymer stabilizer, surfactants as emulsifiers, bitumen material and water. Optionally, the compositions of the disclosure can also comprise a mineral material such as clay.

Additionally, an additive mixture comprising a polymer stabilizer or stabilizers and surfactant emulsifiers is also described. This polymer stabilizer/emulsifier mixture can be used by a formulator to create a cationic emulsion composition using components of the formulator's choice (for example, bitumen and minerals of the formulator's choice).

Emulsions

Asphalt emulsions are bituminous emulsions meeting the requirements of the Standard Specification of Emulsified Asphalt set forth in the American Society for Testing and Materials (ASTM) specification designation D-977, for example. Cationic asphalt emulsions are bituminous emulsions meeting the requirements of the Standard Specification of Cationic Emulsified Asphalt set forth ASTM specification designation D-2397, for example.

Emulsions can be classified into cationic or anionic types depending on the charge on the bitumen droplets. In anionic bitumen emulsions generally, the non-polar tails of the anionic emulsifier align inward toward the bitumen material to form a bitumen emulsion particle having a generally negative charge due to the outward-facing negatively charged polar heads surrounding the bitumen particle. In cationic bitumen emulsions generally, the non-polar tails of the cationic emulsifier align inward toward the bitumen material to form a bitumen emulsion particle having a generally positive charge due to the outward-facing positively charged polar heads surrounding the bitumen particle.

Emulsions can also be classified as rapid, medium and slow-setting types, depending on their reactivity. Rapid-setting (RS) emulsions set quickly in contact with clean aggregates of low-surface area, such as the chippings used in chip seals (surface dressings). Medium-setting (MS) emulsions set sufficiently less quickly that they can be mixed with aggregates of low surface area, such as those used in open-graded mixes. Slow-setting (SS) emulsions will mix with reactive aggregates of high surface area. In general, RS emulsions have the highest amount of reactivity compared to MS and SS emulsions and are used with unreactive aggregates. SS emulsions are generally unreactive and are typically used with reactive aggregates. The actual setting and curing time in the field will depend on the technique and materials being used as well as the environmental conditions. Cationic rapid-setting (CRS), cationic medium-setting (CMS) and cationic slow-setting (CSS) emulsions are cationic emulsions exhibiting the corresponding reactivity.

Polymer Stabilizers

Polymer stabilizers useful in the compositions of the present disclosure generally contain multiple cationic groups in their structures. Cationic groups may be, for example, phosphonium, pyridinium, sulphonium or quaternary ammonium groups. Cationic polymers containing cationic groups of quaternary ammonium are particularly useful. Cationic polymer containing groups whose cationic character is present only in an acid medium are also particularly useful. As such, tertiary amine groups, which are cationic by means of protonation in an acid medium, are also particularly useful.

The cationic groups may be located in the chain of the polymer or as a pendant group, such as a primary, secondary, tertiary amine or quaternary ammonium derivative of polyacrylamide. Cationic polymers may have a linear, comb, or branched structure. The cationic polymers may also have a cross-linking structure, which potentially provides high-dosage efficiency to stabilize minerals in cationic bitumen emulsions.

The cationic polymers useful in the invention can be derived from natural or synthetic sources, including cationic polysaccharides, e.g. those derived from starches, guar gums, celluloses, chitins, chitosans, glycans, galactans, glucans, xanthan gums, pectins, mannans, and dextrins, such as quaternized collagen polypeptides and quaternized wheat polypeptides. Suitable starches include potato, corn, wheat, tapioca, rice, waxy maize, barley, and so forth. Cationic synthetic polymers such as cationic chain-growth polymers may also be used, e.g. cationic vinyl addition polymers like acrylate-, acrylamide-, vinylamine-, vinylamide and allylamine-based polymers, for example homo- and copolymers based on diallyldialkyl ammonium halide, e.g. diallyldimethyl ammonium chloride, as well as (meth)acrylamides and (meth)acrylates. Further polymers include cationic step-growth polymers, e.g. cationic polyamidoamines, polyethylene imines, polyamines, e.g. dialkylamine-epichlorohydrin copolymers, and polyurethanes. Hybrid cationic polymers made from the combination of natural and synthetic sources are also suitable.

Non-limiting examples of polymer stabilizers useful in the emulsion compositions of the present disclosure include alkylene polyamines with three or more nitrogen atoms, alkyl polyamines with two or more nitrogen atoms, hydroxyl-containing polyamines, polyquaternary polymers, polyvinylamine, polyvinylimidazoline, polyester polyquaternary polymers, polyether polyquaternary polymers, polydiallyldimethylammonium chloride (polyDADMAC), poly-dimethyl aminoethyl methacrylate methyl chloride, diaminourea polymers, polyethylenimine, cationic polyacrylamide, polymers made from polyoxyalkylene diamines with diepoxides, copolymers of diallyl ammonium salts and acrylamides, copolymers of acrylic acid with dimethyl diallyl ammonium chloride, ionene polymers made from dihalide of dihaloalkanes, dihaloalkenes or dihaloalkyl ethers and organic amines, and a combination thereof. The polymer stabilizers generally have a molecular weight of 5,000 D to 3,000,000 D.

Polymer stabilizers that are especially useful in the present disclosure are copolymers of epichlorohydrin and organic amines (such as primary, secondary and tertiary amines), copolymers of alkanolamines and mixtures of monocarboxylic acids and dicarboxylic acids, and polydiallyldimethylammonium chloride.

The polymer stabilizers of the present disclosure can also be branched polymers with cross-linking, such as a copolymer of epichlorohydrin, organic amines (such as primary, secondary and tertiary amines), and polyamide-amine cross-linking agent (such as ethylene diamine), or a copolymer of dialkylamine, a poly-alkylenepolyamine, and epichlorohydrin.

In one embodiment, the polymer stabilizer includes cationic polymers that are obtained from polycondensation of dialkylamine (including dimethylamine) and epichlorohydrin, and containing units of the following representative structure (I):

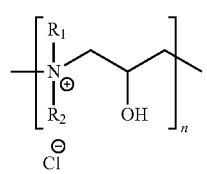

Where $R_1$ and $R_2$ are independently selected from H, a linear or branched alkyl group or hydroxyl alkyl group containing 1-4 carbon atoms, and where n is greater than about 50. Although structure (I) illustrates a chlorine ion (Cl$^-$), other halide ions are suitable for inclusion with the polymer stabilizers of the present disclosure, including but not limited to fluorine, bromine and iodine ions.

In another embodiment, the polymer stabilizer includes cross-linking cationic polymers of representative structure (I) that are crosslinked using polyamide-amine crosslinking agent, such as ethylenediamine. A simplified representative structure (II) for the cross-linking cationic polymer is as follows:

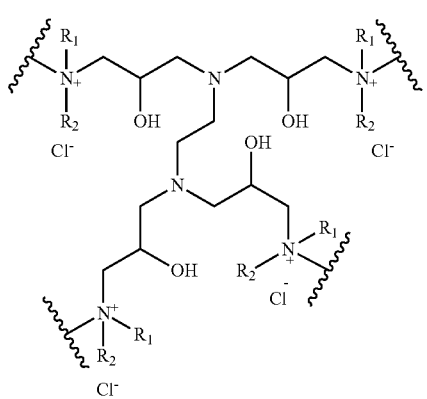

The polymer stabilizers can be prepared by several methods, including free-radical polymerization, epoxide-addition polymerization, condensation polymerization, reactions on polymer backbones and other available means.

Unexpectedly, the presence of the polymer stabilizers in cationic emulsions of the invention does not change the grade of the emulsion (from rapid-setting to slow-setting, for example). The polymer stabilizers can be present in cationic emulsions as part of the emulsifiers by being added through soap solution together with surfactant emulsifiers. They also can be post-added into cationic emulsions after the emulsions have been prepared.

The concentration of polymer stabilizers in the compositions can be about 0.01% to about 5%, and in a further embodiment about 0.1% to 2% at point of use.

Emulsifiers

Emulsifiers useful in the compositions of the disclosure include cationic surfactants. As used herein, cationic surfactants include any surfactant that exhibits cationic properties in the relevant environment. This includes amphoteric surfactants which exhibit cationic properties in acidic environments.

Cationic surfactants useful in the compositions of the disclosure include saturated alkyl amines, saturated alkyl amine derivatives, unsaturated alkyl amines, unsaturated alkyl amine derivatives, saturated alkyl polyamines, saturated alkyl polyamine derivatives, unsaturated alkyl polyamines, unsaturated alkyl polyamine derivatives, alkoxylated alkyl amines, alkyl quaternary ammonium salts, alkyl amine oxides and primary, secondary, or tertiary alkyl amine or alkyl polyamine having an alkyl chain containing 4-40 carbon atoms, and their corresponding salts.

Cationic emulsifiers that are especially useful in the present disclosure are fatty amines and fatty amine derivatives, such as those containing C12-C22 carbons, including but not limited to tallow amine, cocoamine, fatty polyamine, alkoxylated fatty amine, quaternary salts of the fatty amine, commercially available cationic emulsifiers such as REDICOTE® E-9, REDICOTE® E-11E, REDICOTE® E-4819, REDICOTE® E-7000, REDICOTE® E16, REDICOTE® EM-44A available from Akzo Nobel, and mixtures of these surfactants. In some embodiments, cationic emulsifiers may be fatty diamine derivatives such as alkoxylates and derivatives, quaternary ammonium salts, betaines, amine oxides and blends thereof.

Amphoteric surfactants useful in the compositions of the disclosure include alkyl betaines, alkyl polyamine betaines, alkylamido polyamine betaines, imidazoline carboxylates, alkyl aminopropionic acids, commercially available cationic emulsifiers such as REDICOTE® E-7000 available from Akzo Nobel, and mixtures of these surfactants.

Emulsifiers useful in the compositions of the disclosure include cationic and amphoteric surfactants as discussed above, mixtures of both cationic and amphoteric surfactants, as well as their mixtures with non-ionic surfactants in some cases. Non-ionic surfactants useful in the compositions of the invention include alkylphenolethoxylates, alkoxylated alkyl alcohols, alkoxylated sorbitol, alkoxylated sorbitol esters, alkyl polyglycosides, commercially available cationic emulsifiers such as REDICOTE® E-47 available from Akzo Nobel, and mixtures of these surfactants.

The concentration of emulsifiers in the compositions can be in the range of about 0.01% to about 5%, and in a further aspect can be about 0.1% to about 2% at point of use.

Bitumen Materials

Bitumen is an oil based non-crystalline solid or viscous substance derived from petroleum that exists naturally or as a by-product of refinery processes. Bitumen has adhesive properties and is a mixture of organic liquids that are highly viscous, black, sticky, and composed primarily of highly condensed polycyclic aromatic hydrocarbons.

Bitumen materials useful in the compositions of the disclosure include, for example, asphalt cement, tar, or crude oil bottom. The bitumen materials can be performance grade bitumen, penetration grade bitumen, blown grade bitumen or oxidized grade bitumen. The bitumen materials may contain modifiers such as polymers, ground tire rubber, recycled engine oils, adhesion promoters, phosphoric acid, poly phosphoric acid, sulfur, wax and other modifiers commonly used in bitumen technology.

Bitumen modifiers may contain minerals insoluble in water and bitumen. Ground tire rubber may contain carbon black, calcium carbonate, and silica components. These components show up, for example, in analysis of the rubber as "ash" and as "insoluble" (trichloroethylene or xylene insoluble material in standards such as ASTM). Silica may be present as an anti-caking agent, as well as in polymers, including styrene butadiene. Certain recycled engine oils which may be used as bitumen fluxes may contain mineral and/or metal particles either as components of the original oil, or as a result of chemical changes during use of the oil. Bitumen modifiers may also be a source of minerals in a bitumen emulsion. The mineral particles present in the bitumen emulsion as a result of bitumen modifiers in the bitumen phase can also destabilize the bitumen in water emulsion.

The concentration of bitumen materials in the compositions can be in the range of about 30% to about 80%, and in a further aspect about 40% to 70% at point of use.

Bitumen materials are generally classified into different categories of hardness based upon the penetration index of the particular bitumen material. Penetration index measures the amount a device penetrates into the surface of a bitumen material as measured, for example, using American Society for Testing and Materials (ASTM) standard test methodology ASTM D5. The PEN units referred to herein are a measure of the penetration index under the ASTM D5 methodology.

Hard base bitumen materials generally have a penetration of no more than about 40 PEN or a softening point of no less than about 65° C. Medium base bitumen materials generally have a penetration of between about 40-100 PEN or a softening point of about 40-65° C. Soft base bitumen materials have a penetration of no less than about 100 PEN or a softening point of no greater than about 40° C.

Mineral Materials

Optionally, minerals can be incorporated into the compositions of the present disclosure. Examples of minerals that may be included in the composition include, but are not limited to, clay minerals, and particularly montmorillonite, illite, kaolinite, muscovite, chlorite, natural or synthetic clay, hydrophobic modified organoclay, talc, lime, cementitious material, silica/silicate, carbon black, calcium carbonate, slate, and combinations thereof. As described in the Examples, minerals are preferably added into the cationic emulsions of the disclosure as part of the soap solution during emulsion production. This direct formulation is advantageous from a manufacturing efficiency perspective. Alternatively, as described further in the Examples below, the minerals can be post-added to a cationic emulsion after the emulsion composition has been formed.

In some approaches, minerals are incorporated into the compositions of the present disclosure as part of the bitumen material, prior to emulsification. Bitumen materials may include bitumen modifiers which can include minerals. As described in the Examples, minerals may be present in the bitumen emulsions as a result of modifiers, such as ground tire rubber, used to prepare modified bitumen. Ground tire rubber modified bitumens may be prepared by dispersing ground tire rubber into hot bitumen, resulting in mineral components from the ground tire rubber being present in the bitumen phase prior to emulsification.

In another aspect as described in further Examples below, the polymer stabilizer and mineral compound can be mixed together, and this polymer/mineral mixture can be post-added to the cationic emulsion composition.

Compositions

The compositions of the present disclosure generally can have a pH in the range of about 0.5 to about 8, in a further aspect 1 to 6, and in a further aspect in the range of about 2 to 2.5. At this pH range, emulsion compositions generally exhibit cationic properties even for compositions comprising the amphoteric emulsifiers described herein.

The compositions of the disclosure further comprise an aqueous carrier, generally in the range of between about 20% to about 70% water, for example about 30% to about 60% at point of use.

In another aspect, the present disclosure comprises a mixture of polymer stabilizer and emulsifier. For example, about one part of polyquaternary polymers made from epichlorohydrin, dimethylamine, and ethylenediamine (for example EKA ATC® 4350) combined with about 4 to about 8 parts of a cationic rapid and medium setting emulsifier (for example REDICOTE® E-7000) results in a precursor mixture that can be readily shipped and stored for later use in the formulation of a solution combining additional components of a formulator's choice. This precursor mixture provides convenience and efficiency to a formulator, and allows the formulator to quickly and easily utilize the precursor mixture as a component in compositions being formulated. For example, a precursor mixture containing about 1 part EKA ATC® 4350 and 4 parts REDICOTE® E-7000 can be combined with 1 part water and 0.06 parts HCl to create a cationic emulsion according to the present disclosure.

As described in the Examples, the compositions of the present disclosure exhibit unexpectedly improved stability. This improved stability is exhibited by a reduction in precipitation and settlement in the composition, reduced emulsion particle size, and a general increase in viscosity of the cationic emulsions of the present disclosure compared to cationic emulsions in the art. These benefits are particularly pronounced with compositions comprising hard base bitumen materials, for example bitumen materials with a penetration of no more than 40 PEN or a softening point of no less than 65° C. This improved stability allows mineral materials to be added to cationic compositions during or after the emulsion formation stage without the breakage of emulsions that typically occur when minerals are added to conventional cationic emulsions.

The compositions of the present disclosure are well-suited for use in pavement applications. Thus, another aspect of the present disclosure is a method of applying pavement to a surface, which comprises the steps of contacting a surface with a mixture of aggregate and the bitumen-in-water emulsion composition or an aqueous medium comprising the bitumen-in-water emulsion composition of the present disclosure, and allowing the emulsion to cure to create a pavement surface.

The compositions of the present disclosure are well-suited for use in bitumen-coating applications. Thus, another aspect of the present disclosure is a method of creating a bitumen-coated surface, which comprises the steps of contacting a surface with the bitumen-in-water emulsion composition or an aqueous medium comprising the bitumen-in-water emulsion composition of the present disclosure, and allowing the emulsion to cure to create a bitumen-coating.

The compositions of the present disclosure are also well-suited for use in various other bitumen-based applications including roofing, bitumen-adhesives, and bitumen-sealants. Methods of using the compositions of the present disclosure in these applications are similar to the methods described herein for use in pavement and bitumen-coating applications.

Herein, unless otherwise noted, all percentages are by weight.

References to molecular weight herein refer to the number averaged molecular weight (Mn), as measured by GPC using polystyrene standards.

References to viscosity herein are to Saybolt Furol Seconds (SFS) units measured using standard test methodology ASTM D-88 and ASTM D-244.

The following Examples illustrate various embodiments of the present disclosure. The Examples are intended to exemplify the present disclosure but are not intended to limit the scope of the invention in any way. The breadth and scope of the invention are to be limited solely by the claims appended hereto.

General Procedures for Examples 1-6

Cationic emulsions of various compositions were created using a DenimoTech® SEP 0.3R lab colloid mill available from DenimoTech® NS (Aarslev, Denmark), with bitumen material and emulsifier soap solution maintained at constant temperatures in separate tanks. The temperature of bitumen material was maintained at between about 140-175 Celsius, depending on the hardness of the bitumen material. In general, hard bitumen material requires relatively higher temperatures during emulsion production.

The penetration of the bitumen materials used in the examples was measured according to ASTM standard test methodology ASTM D5. The temperature of emulsifier soap solutions was maintained at between about 45-70 Celsius, depending on the temperature of bitumen material. When the exit temperature of the emulsion was expected to be above 95 Celsius, a heat exchanger was used to cool the emulsion temperature down to below 95 Celsius. In all other cases, no heat exchanger was utilized.

The cationic emulsions were measured for percentage of residue using standard test methodology ASTM D 6934, and for storage stability using standard test methodology ASTM D 6934. Emulsions were measured for viscosity using standard test methodology ASTM D 88 and for consistency using standard test methodology ASTM D 244 using a K21410 Saybolt Viscometer available from Koehler Instrument Company Inc. (Bohemia, N.Y.). Emulsions were measured for particle size using an LS 13 310 particle counter available from Beckman Coulter (Brea, Calif.). Demulsibility of the emulsions was measured by the method described in ASTM D 6936.

Example 1. Cationic Rapid-Setting Emulsions with PG 64-22 Asphalt Binder

Exemplary testing formulations were prepared according to the components and characteristics shown in Table 1. The compositions were prepared using the general procedure described above, except the asphalt phase was maintained at about 140° C., and the soap solution was maintained at about 45° C. In this example, cationic rapid-setting emulsions were formulated with a medium base PG 64-22 asphalt binder from Valero Marketing and Supply Company (San Antonio, Tex.). "Target AC" in the Tables herein refers to the target percentage (by weight) of asphalt binder in the emulsion. Compositions 99-0, 99-1E, 99-2E, 99-3E, 99-4E, 99-5E and 99-6E targeted an AC concentration of 61%, and compositions 99-7E, 99-8E, 99-9E, and 99-10E targeted an AC concentration of 67%. Composition 99-0 resulted in no measurable emulsion being formed.

The emulsifier used in this example was REDICOTE® E-4819, a cationic rapid and medium setting emulsifier available from Akzo Nobel. Polymer stabilizers used in this example were BEWOTEN® C410 and EKA ATC® 4350 from Akzo Nobel, polyquaternary polymers made from epichlorohydrin, dimethylamine, and ethylenediamine. "Bentonite" in the Tables herein refers to the mineral of water-swelling sodium bentonite clay available, for example, from Extendit Company (Youngstown, Ohio). "HCl" in the table refers to concentrated hydrochloric acid. "Soap pH" refers to the pH of the soap solution measured using a lab pH meter. Emulsion residue % refers to the percentage of residue in the emulsion. The amount of asphalt compound that settled out of the composition was determined after the composition rested at standard room temperature and pressure for a five day period using standard test methodology ASTM D 6930. Viscosity was measured at composition temperature 25° C. "N/D" in the Tables herein indicates that the value was not determined. Except asphalt binder, all ingredients when used were added in the soap solution during emulsion production. All percentages identified in Table 1 indicate percent by weight.

TABLE 1

Cationic RS Emulsions With PG 64-22 Asphalt Binder.

| Reference No. | 99-0 | 99-1E | 99-2E | 99-3E | 99-4E | 99-5E | 99-6E | 99-7E | 99-8E | 99-9E | 99-10E |
|---|---|---|---|---|---|---|---|---|---|---|---|
| Target AC, % | 61 | 61 | 61 | 61 | 61 | 61 | 61 | 67 | 67 | 67 | 67 |
| Redicote E-4819, % | 0.2 | 0.2 | 0.2 | 0.2 | 0.2 | 0.2 | 0.2 | 0.2 | 0.2 | 0.2 | 0.2 |
| Bewoten C410, % | — | — | 0.3 | 0.5 | 0.5 | 0.5 | — | — | 0.5 | — | — |
| Eka ATC 4350, % | — | — | — | — | — | — | 0.5 | — | — | 0.5 | 1.0 |
| Bentonite, % | 1.0 | — | — | — | 0.6 | 1.0 | 0.6 | — | — | — | — |
| HCl, % | 0.23 | 0.23 | 0.23 | 0.23 | 0.23 | 0.27 | 0.27 | 0.27 | 0.27 | 0.27 | 0.27 |
| soap pH | 1.9 | 1.9 | 1.9 | 1.9 | 1.9 | 2.0 | 2.1 | 2.0 | 2.0 | 2.0 | 1.9 |
| Emulsion residue, % | none | 61.2 | 61.3 | 62.0 | 61.7 | 62.1 | 62.1 | 68.8 | 69.1 | 68.3 | 68.9 |
| Viscosity at 50° C., SFS | | 37 | 37 | 51 | 55 | 150 | 35 | 1294 | 2227 | 1865 | 2520 |
| Demulsibility, % | | 97.9 | 77.2 | 70.6 | N/D | 82.5 | 93.5 | 99.7 | 99.0 | 99.5 | N/D |
| Median particle size, μm | | 2.595 | 2.562 | 2.472 | 3.413 | 2.657 | 2.535 | 3.468 | 2.901 | 2.733 | 3.048 |
| asphalt settling overnight | | minor | none | none | none | none | none | N/D | N/D | N/D | N/D |

As can be seen from the data in Table 1, cationic RS bitumen emulsions at acidic pH (pH ~2.0) can be made with the presence of polymer stabilizers, such as BEWOTEN® C410 and EKA ATC® 4350, and the resulting emulsions are compatible to water-swelling sodium bentonite clay. The clay mineral is added as part of soap solution during emulsion production, and the resulting emulsions are stable and can be classified as cationic rapid-set emulsions. The emulsions made with polymer stabilizers possess higher viscosities and show better stability with no asphalt compound settlement than emulsions made without polymer stabilizer. For example, composition 99-1E (lacking a polymer stabilizer) exhibited asphalt settling, whereas compositions 99-2E, 99-3E, 99-4E, 99-5E and 99-6E (all containing a polymer stabilizer) exhibited no AC settling. Likewise, composition 99-7E (lacking a polymer stabilizer) exhibited substantially larger emulsion particle size than compositions 99-8E, 99-9E, 99-10E (all containing a polymer stabilizer.) Composition 99-0 (lacking a polymer stabilizer but containing Bentonite) exhibited no measurable emulsion being present.

Example 2. Cationic Slow-Setting Emulsions with Zero PEN Asphalt Binder

Exemplary testing formulations were prepared according to the components and characteristics shown in Table 2. The compositions were prepared using the general procedure described herein, except the asphalt phase was maintained at about 175° C., the soap solution was maintained at about 65° C., and a heat exchanger was used to cool the emulsion.

In this example, cationic slow-setting emulsions were formulated with hard base Zero PEN asphalt from Blacklidge Emulsions, Inc. (Gulfport, Miss.). Unless indicated otherwise, the category abbreviations of Table 2 have the same meaning as the corresponding abbreviations of Table 1.

The emulsifiers used in this example were REDICOTE® E-7000, and REDICOTE® E-11E available from Akzo Nobel. REDICOTE® E-7000 is an amphoteric emulsifier for both cationic and anionic SS emulsions. REDICOTE® E-11E is a cationic SS emulsifier.

Polymer stabilizers used in this example were BEWOTEN® C410 and EKA ATC® 4350 (both used in Example 1), as well as EKA ATC® 4350 U also available from Akzo Nobel. All three of these polymer stabilizers used in this example are polyquaternary polymers made from epichlorohydrin, dimethylamine, and ethylenediamine. All three polymers are made from the same raw materials, but start with different mixing ratios and may undergo different synthetic routes. Each of these polymers has different molecular weights and different degrees of cross-linking. Viscosity was measured at composition temperature of 25° C. Except asphalt binder, all ingredients when used are added in the soap solution during emulsion production. All percentages identified in Table 2 indicate percent by weight.

TABLE 2

Cationic RS and Cationic SS Emulsions With Zero PEN Asphalt Binder.

| Reference No. | 590-2E | 590-3E | 590-4E |
| --- | --- | --- | --- |
| Target AC, % | 65 | 65 | 65 |
| Redicote E-7000, % | 2.0 | 2.0 | 2.0 |
| Redicote E-11E, % | 1.0 | 1.0 | 1.0 |
| Bewoten C410, % | 0.5 | — | — |
| Eka ATC 4350, % | — | 0.5 | — |
| Eka ATC 4350 U, % | — | — | 0.5 |
| Bentonite, % | 0.65 | 0.65 | 0.65 |
| HCl, % | 0.23 | 0.23 | 0.23 |
| soap pH | 2.0 | 2.0 | 2.0 |
| emulsion residue, % | 65.9 | 66.3 | 66.4 |
| Viscosity at 25° C., SFS | 108 | 180 | 224 |
| Median particle size, μm | 7.375 | 6.820 | 6.080 |
| asphalt settling overnight | none | none | none |

As can be seen from the data, cationic SS emulsions at acidic pH (e.g., pH ~2.0) can be made with the presence of polymer stabilizers, such as BEWOTEN® C410, EKA ATC® 4350 and EKA ATC® 4350 U, and the resulting emulsions are compatible to water-swelling sodium bentonite clay. The clay mineral is added as part of the soap solution during emulsion production, and the resulting emulsions are very stable.

Example 3. Cationic Rapid-Setting Emulsions with Hard PEN Asphalt Binder

Exemplary testing formulations were prepared according to the components and characteristics shown in Table 3. The compositions were prepared using the general procedure described herein, except the asphalt phase was maintained at about 165° C., the soap solution was maintained at about 65° C., and a heat exchanger was used to cool the emulsion.

In this example, cationic RS emulsions were formulated with hard base asphalt (e.g. about 4 PEN) available from Calumet Specialty Products Partners (Indianapolis, Ind.). Unless indicated otherwise, the abbreviations of Table 3 have the same meaning as the corresponding abbreviations of Table 1.

The emulsifier used in this example was REDICOTE® E-9, a cationic RS and MS emulsifier available from Akzo Nobel. The polymer stabilizer used in this example was BEWOTEN® C410, a polyquaternary polymer made from epichlorohydrin, dimethylamine, and ethylenediamine with different molecular weights. Except asphalt binder, all ingredients when used were added in the soap solution during emulsion production. All percentages identified in Table 3 indicate percent by weight.

TABLE 3

Cationic RS Emulsions With Hard PEN Asphalt Binder

| Reference No. | 566-0 | 566-1E | 566-2E | 566-3E | 566-4E | 566-5E | 566-7E | 566-8E | 566-9E | 566-10E | 566-11E |
|---|---|---|---|---|---|---|---|---|---|---|---|
| Target AC, % | 62 | 62 | 62 | 62 | 62 | 62 | 62 | 62 | 62 | 62 | 62 |
| Redicote E-9, % | 0.4 | 0.4 | 0.4 | 0.4 | 0.4 | 0.4 | 0.4 | 0.3 | 0.3 | 0.2 | 0.2 |
| Bewoten C410, % | — | — | 0.3 | 0.5 | 1.0 | 0.5 | 0.3 | — | 0.5 | — | 0.5 |
| Bentonite, % | 0.5 | — | — | — | — | 0.5 | 0.5 | — | — | — | — |
| HCl, % | 0.35 | 0.35 | 0.35 | 0.35 | 0.35 | 0.35 | 0.35 | 0.35 | 0.33 | 0.29 | 0.25 |
| soap pH | 2.4 | 2.4 | 2.4 | 2.5 | 2.4 | 2.4 | 2.4 | 2.2 | 2.1 | 2.1 | 2.1 |
| emulsion residue, % | none | 62.1 | 62.2 | 62.6 | 62.1 | 62.7 | 62.4 | 62.5 | 62.0 | 61.8 | 62.0 |
| Viscosity at 25° C., SFS | | 20 | 31 | 45 | 53 | 56 | 52 | <20 | 35 | <20 | 26 |
| Median particle size, μm | | 5.627 | 4.108 | 5.027 | 3.166 | 3.696 | 5.055 | 6.575 | 3.025 | 9.105 | 5.137 |
| 5-day settlement, % | | 11.41 | 6.1 | 11.21 | 4.76 | 3.5 | 1.32 | N/D | 7.73 | N/D | 10.76 |
| Asphalt settling overnight | Minor soft AC settle | none | none | none | none | none | none | Minor soft AC settle | none | hard crust formed on top surface Minor soft AC settle | none |

As can be seen from the data in Table 3, cationic RS emulsions at acidic pH (e.g. pH of about 2.1 to about 2.5) can be made with the presence of polymer stabilizer BEWOTEN® C410. The resulting emulsions made with polymer stabilizer give higher viscosity and smaller emulsion particle size than the emulsions made without polymer stabilizer. The emulsions made with polymer stabilizer also show better stability with less or no asphalt settlement than the emulsions made without polymer stabilizer. For example, compositions 566-1E, 566-8E and 566-10E (lacking a polymer stabilizer) exhibited some asphalt settling, whereas the remaining compositions containing a polymer stabilizer exhibited no asphalt settling. Composition 566-0 (lacking a polymer stabilizer but containing bentonite) exhibited no measurable emulsion being present.

The emulsions made with polymer stabilizer are compatible with water-swelling sodium bentonite clay, allowing the incorporation of clay in the emulsion. The clay mineral was added as part of the soap solution during emulsion production, and the resulting emulsions show improved stability and storage ability compared to emulsions made without polymer stabilizer. The use of polymer stabilizer also allows for the formation of stable cationic RS emulsions with less amount of emulsifier needed. For example emulsion 566-1E (containing 0.4% REDICOTE® E-9), emulsion 566-9E (containing 0.3% REDICOTE® E-9/0.5% BEWOTEN® C410) and emulsion 566-11E (containing 0.2% REDICOTE E-9®/0.5% BEWOTEN® C410) showed relatively higher viscosity, smaller particle size and less 5-day settlement than emulsions lacking polymer stabilizers. As shown, the addition of polymer stabilizer enables the formation of stable cationic rapid-setting emulsions with less amount of emulsifier needed.

Example 4. Cationic Rapid-Setting Emulsions with Hard PEN Asphalt Binder

Exemplary testing formulations were prepared according to the components and characteristics shown in Table 4. The compositions were prepared using the general procedure described herein, except the asphalt phase was maintained at about 160° C. to about 165° C., the soap solution was maintained at about 65° C., and a heat exchange was used to cool the emulsion.

In this example, cationic RS emulsions were formulated with hard PEN asphalt binder (about 4-6 PEN) available from Calumet Specialty Products Partners (Indianapolis, Ind.). Unless indicated otherwise, the abbreviations of Table 4 have the same meaning as the corresponding abbreviations of Table 1.

Individual emulsifier of either REDICOTE® EM-44A or REDICOTE® E-9 were used to prepare cationic rapid-setting emulsions. REDICOTE® EM-44A and REDICOTE® E-9 are cationic RS and MS emulsifiers available from Akzo Nobel. The polymer stabilizer used in this example was BEWOTEN® C410. Viscosity of the compositions was measured at composition temperature 25° C. Except asphalt binder, all ingredients when used are added in the soap solution during emulsion production. All percentages identified in Table 4 indicate percent by weight.

TABLE 4

Cationic RS Emulsions With Hard PEN Asphalt Binders

| Reference No. | 510-11E | 510-13E | 510-12E | 510-14E | 510-16E | 510-15E | 510-17E |
|---|---|---|---|---|---|---|---|
| Target AC, % | 62.0 | 62.0 | 62.0 | 62.0 | 62.0 | 62.0 | 62.0 |
| Redicote E-9, % | | | | 0.45 | 0.45 | 0.45 | 0.45 |
| Redicote EM-44A, % | 0.45 | 0.45 | 0.45 | | | | |
| Bewoten C410, % | — | 0.5 | 1.0 | — | 0.5 | 1.0 | 0.5 |
| Bentonite, % | — | — | — | — | — | — | 1.2 |
| HCl, % | 0.4 | 0.4 | 0.4 | 0.4 | 0.4 | 0.4 | 0.4 |
| soap pH | 2.1 | 2.1 | 2.1 | 2.1 | 2.1 | 2.1 | 2.1 |
| emulsion residue, % | 62.99 | 63.12 | 61.83 | 62.72 | 63.76 | 62.66 | 63.43 |

TABLE 4-continued

Cationic RS Emulsions With Hard PEN Asphalt Binders

| Reference No. | 510-11E | 510-13E | 510-12E | 510-14E | 510-16E | 510-15E | 510-17E |
|---|---|---|---|---|---|---|---|
| Viscosity at 25° C., SFS | 16 | 28 | 35 | 24 | 35 | 60 | 828 |
| Median particle size, μm | 7.799 | 4.124 | 3.415 | 3.646 | 4.181 | 2.446 | 3.493 |
| asphalt settling overnight | hard crust formed on top surface. Minor soft AC settle | none | none | Minor soft AC settle | none | none | none |

As can be seen from the data in Table 4, cationic rapid setting emulsions at acidic pH (e.g. pH of about 2.1 to about 2.2) can be made with the presence of polymer stabilizers, particularly BEWOTEN® C410. The resulting emulsions made with polymer stabilizers give higher viscosity and generally smaller emulsion particle size than the emulsions made without polymer stabilizer. The resulting emulsions made with polymer stabilizers also show better stability with less or no AC settlement than the emulsions made without polymer stabilizer. The emulsions made with polymer stabilizers are compatible with sodium bentonite clay, allowing the incorporation of this extremely water-swelling clay in the emulsion. The clay mineral is added as part of soap solution during emulsion production, and the resulting emulsions show improved stability and storage ability compared to emulsions made without polymer stabilizer.

Example 5. Cationic Slow-Setting Emulsions with Hard PEN Asphalt Binder

Exemplary testing formulations were prepared according to the components and characteristics shown in Table 5. The compositions were prepared using the general procedure described herein, except the asphalt phase was maintained at about 160° C., the soap solution was maintained at about 65° C., and a heat exchanger was used to cool the emulsion.

In this example, cationic slow-setting emulsions were formulated with hard PEN asphalt (e.g. about 10 PEN) from Blacklidge Emulsions Inc. Unless indicated otherwise, the abbreviations of Table 5 have the same meaning as the corresponding abbreviations of Table 1.

The emulsifiers used in this example were a combination of REDICOTE® E-7000 and REDICOTE® E-11E. The polymer stabilizer used in this example was BEWOTEN® C410. The percent settlement of the emulsion was determined after the composition rested at standard room temperature and pressure for a period of several weeks. Except asphalt binder, all ingredients when used are added in the soap solution during emulsion production. All percentages identified in Table 5 indicate percent by weight.

TABLE 5

Cationic RS Emulsions With Hard PEN Asphalt Binder

| Reference No. | 468-1E | 468-3E | 468-6E | 468-7E | 468-0 |
|---|---|---|---|---|---|
| Target AC, % | 62 | 62 | 62 | 62 | 62 |
| Redicote E-11E, % | 1.0 | 1.0 | — | 1.0 | 1.0 |
| Redicote E-7000, % | 2.0 | 2.0 | — | 2.0 | 2.0 |
| Bewoten C410, % | — | 1.0 | 2.0 | 1.0 | — |
| Bentonite, % | — | — | — | 1.5 | 1.5 |
| HCl, % | — | — | 0.04 | — | — |

TABLE 5-continued

Cationic RS Emulsions With Hard PEN Asphalt Binder

| Reference No. | 468-1E | 468-3E | 468-6E | 468-7E | 468-0 |
|---|---|---|---|---|---|
| soap pH | ~5.6 | ~5.2 | ~3 | ~5.7 | ~5.9 |
| emulsion residue, % | 62.7 | 64.0 | 63.3 | 63.8 | Emulsion broke overnight |
| Median particle size, μm | 6.684 | 2.203 | No emulsion | 5.294 | |
| asphalt settling | Minor settling after 2 weeks | None after 6 weeks | N/D | None after 6 weeks | N/D |

As can be seen from the data in Table 5, addition of polymer stabilizer BEWOTEN® C410 to the composition resulted in smaller particle size and higher viscosities of the emulsions than those without polymer stabilizer. Addition of BEWOTEN® C410 also improved emulsion storage stability. With polymer stabilizer BEWOTEN® C410 present, extremely water-swelling sodium bentonite clay can be added as part of soap solution into the emulsion and form very stable emulsions. As shown by composition 468-6E, however, a composition comprising only the polymer stabilizer BEWOTEN® C410 alone (without an emulsifier) generally does not produce an acceptable emulsion.

Example 6. Addition of Ground Tire Rubber to Cationic Emulsions

Exemplary testing formulations were prepared according to the components and characteristics shown in Tables 6a and 6b. The compositions were prepared using the general procedure described herein, except the asphalt phase was maintained at about 155° C., the soap solution was maintained at about 55° C., and a heat exchange was used to cool the emulsion.

In this example, cationic RS emulsions were formulated with a ground tire rubber (GTR) polymer modified asphalt binder (GTR PMAC), where minus 80 mesh GTR from Paragon Laboratories (Livonia, Mich.) was blended into PG 64-22 asphalt cement from ExxonMobil (Irving, Tex.) using a Silverson L4RT high shear mixer at 5000 rpm at about 190° C. to about 200° C. for about an hour to prepare a 5.5% GTR PMAC or a 5% GTR PMAC (by weight of GTR on PG 64-22 asphalt cement). 1.0% REDICOTE AP based on the weight of the GTR PMAC was post-added into the GTR PMAC prior to emulsification. Unless indicated otherwise, the abbreviations of Tables 6a and 6b have the same meaning as the corresponding abbreviations of Table 1.

Emulsifier of REDICOTE® E-4819 was used to prepare cationic rapid-setting emulsions in Table 6a. REDICOTE®

E-4819 is cationic RS and MS emulsifiers available from Akzo Nobel. The polymer stabilizer used in this example was EKA ATC® 4350. Viscosity of the compositions in Table 6a was measured at composition temperature 50° C. Emulsifier REDICOTE® EM-44A was used to prepare the cationic rapid-setting emulsion in Table 6b.

All percentages identified in Tables 6a and 6b indicate percent by weight, except otherwise indicated. The cationic emulsions were also measured for percentage of oversized particles in emulsified asphalts using standard test methodology ASTM D 6933 (Sieve Test), where distilled water was used in all wetting and washing operations in place of the nonionic surfactant solution (1%) per ASTM D 2397.

TABLE 6a

Cationic RS Emulsions With GTR PMAC with Polymer Stabilizer

| Reference No. | 282-5E | 282-6E | 282-7E | 282-8E |
|---|---|---|---|---|
| Target AC[a], % | 61.0 | 61.0 | 67.0 | 67.0 |
| Redicote E-4819, % | 0.3 | 0.2 | 0.3 | 0.2 |
| EKA ATC 4350, % | 1.0 | 1.0 | 1.0 | 1.0 |
| Redicote AP[b], % | 1.0 | 1.0 | 1.0 | 1.0 |
| HCL, % | 0.21 | 0.16 | 0.20 | 0.15 |
| Soap pH | 2.0 | 2.0 | 2.0 | 2.0 |
| Appearance | Stable, slight fine graininess visible | Stable, slight fine graininess visible | Stable, slight fine graininess visible | Stable, slight fine graininess visible |
| pH of emulsion | 4.50 | 4.70 | 4.89 | 4.94 |
| Residue, % | 58.8 | 60.3 | 66.8 | 67.3 |
| Sieve Test, % | <0.1% | <0.1% | <0.1% | <0.1% |
| Visc. @ 50° C., SFS | 25 | 30 | 438 | 180 |
| Demulsibility Test, % | 49.4 | 75.9 | 81.6 | 95.0 |
| Particle Size, microns | | | | |
| Median | 6.84 | 7.69 | 7.75 | 9.15 |
| Mean | 9.30 | 10.46 | 9.69 | 12.43 |

[a]5.5% GTR PMAC
[b]Redicote AP based on the weight of the GTR PMAC

TABLE 6b

Cationic RS Emulsion With GTR PMAC Without Polymer Stabilizer

| Reference No. | 034-4E |
|---|---|
| Target AC[a], % | 62.0 |
| Redicote EM-44A, % | 0.6 |
| EKA ATC 4350, % | — |
| Redicote AP[b], % | 1.0 |
| Bermocoll EM7000FQ, % | 0.15 |
| Calcium Chloride | 0.1 |
| HCL, % | 0.2 |
| Soap pH | 2.0 |
| Appearance | Visual inspection of emulsion after exiting the emulsion mill showed no separation, but emulsion broke during storage, within a few hours or overnight |

[a]5% GTR PMAC
[b]Redicote AP based on the weight of the GTR PMAC

As can be seen from the data in Tables 6a and 6b, stable cationic RS emulsions with GTR PMAC can be achieved using polymer stabilizer EKA ATC® 4350. Use of polymer stabilizer assists in the stability of emulsions prepared with ground tire rubber modified asphalt, such as emulsions using rapid set emulsifiers. Compositions 282-5E, 282-6E, 282-7E and 282-8E in Table 6a containing the polymer stabilizer result in stable emulsions exhibiting almost no oversized particles, whereas composition 034-4E prepared without a polymer stabilizer resulted in an unstable emulsion which broke during a short period of time, such as a few hours, and/or overnight.

General Procedures for Examples 7-8

Mineral compatibility with the cationic bitumen emulsion of the disclosures was further evaluated by post-addition of betonite clay slurry into compositions after emulsions had been created. In a first approach, a cationic emulsion was prepared with the polymer stabilizer as part of the soap solution, and then bentonite clay slurry was added into the emulsion to check their compatibility. In a second approach, the polymer stabilizer was mixed into pre-manufactured cationic emulsions to form a uniform mixture, then bentonite clay slurry was added into this mixture to check the compatibility. In a third approach, the polymer stabilizer was mixed with bentonite slurry to form a uniform mixture, then the slurry mixture was added into the pre-manufactured cationic emulsion to check the compatibility. Any sign of breakage of the emulsion due to addition of clay slurry indicated that the emulsion was incompatible with clay. The observation of a continuously stable emulsion after mixing with clay slurry indicated the emulsion was compatible with clay.

Example 7. Post-Addition of Bentonite Minerals with Emulsion Compositions Comprising REDICOTE E-7000 and REDICOTE E-11E Exemplary testing formulations were prepared according to the components and characteristics shown in Table 7. The compositions were prepared and stability testing was performed using the general post-addition procedure described above, with the polymer stabilizer as part of the soap solution, and then bentonite clay slurry added into the emulsion. Compositions 468-1E and 468-3E (described in Table 5) were used as the underlying compositions in this example. These compositions were prepared according to the procedure described in Example 5, and contain REDICOTE® E-7000 and REDICOTE® E-11E (either alone or in combination). Composition 468-1E contains no polymer stabilizer, and Composition 468-3E contains BEWOTEN® C410 as the polymer stabilizer. The weight (in grams) of each component used in the exemplary testing formulations is indicated in Table 7.

TABLE 7

Post-Addition of Bentonite to REDICOTE E-7000 and REDICOTE E-11E Emulsions

| Reference No. | 98-3 | 98-6 |
|---|---|---|
| 468-1E, g | 75 | — |
| 468-3E, g | — | 76 |
| 7.5% Bentonite Slurry, g | 33 | 33 |
| Stability | Breakage <1 hour | Stable, minor grains |

As can be seen from the data in Table 7, cationic slow-setting emulsions made with a combination of REDICOTE® E-11E and REDICOTE® E-7000 (e.g. composition 468-1E) are not compatible to bentonite clay, but the presence of polymer stabilizer in the emulsions (e.g. composition 468-3E) made these cationic slow-setting emulsions compatible to extremely water swelling bentonite clay that are post-added to the composition.

Example 8. Post-Addition of Bentonite Minerals with Additional Emulsion Compositions Additional cationic emulsion compositions were created for use with the post-addition analysis described here in Example 8. These compositions were prepared using the general procedure described above regarding Examples 1-6.

Specifically, cationic emulsions using various asphalt binders were prepared according to the components and characteristics shown in Table 8.

The asphalt materials used in this example were Hard PEN asphalt (e.g. about 4 PEN) available from Calumet Specialty Products Partners (Indianapolis, Ind.), PG 64-22 asphalt available from TriState Materials (Coachella, Calif.) and polymer modified asphalt.

The emulsifiers used in this example were REDICOTE® E-7000, REDICOTE® E-11E, REDICOTE® E-16, and REDICOTE® EM-44A. REDICOTE® E-16 is a cationic rapid and medium-setting emulsifier. All of the REDICOTE emulsifiers used in this Example are available from Akzo Nobel. The viscosity modifier BERMOCOLL® EM-7000FQ available from Akzo Nobel was also used in sample compositions of this example. The emulsion grade CRS-1H refers to emulsion residues of at least 60% of relatively hard asphalt binder, and CRS-2P refers to emulsion residues of at least 65% of polymer modified asphalt binder.

TABLE 8

Additional Cationic Emulsions For Post-Addition Analysis

| Reference No. | A | B | C | D |
|---|---|---|---|---|
| Asphalt Type | Hard PEN from Calumet | Hard PEN from Calumet | PG 64-22 from Southeast Emulsions | Polymer modified asphalt |
| Target AC, % | 52 | 56 | 62 | 71 |
| Redicote E-11E, % | 1.0 | 1.0 | — | — |
| Redicote E-7000, % | 2.0 | 2.0 | — | — |
| Redicote E-16, % | — | — | 0.2 | — |
| Redicote EM-44A, % | — | — | — | 0.3 |
| Redicote E-4868, % | — | — | — | — |
| Bermocoll EM-7000FQ | 0.2 | 0.2 | — | — |
| soap pH | 5.8 | 6.2 | 2 | 2 |
| Emulsion residue, % | 52.5 | 55.2 | 62.0 | 70.9 |
| Asphalt temperature, C. | 168 | 168 | 135 | 160 |
| Soap temperature, C. | 70 | 47 | 40 | 65 |
| Heat Exchanger | yes | no | no | yes |
| Emulsion grade | CSS | CSS | CRS-1H | CRS-2P |

Bentonite slurry was post-added to the compositions described in Table 8. These post-addition compositions were prepared and tested using the general post-addition procedure described above with respect to Examples 7 and 8. Reference sample 96-9 was prepared by mixing the clay slurry with the polymer stabilizer before mixing with the emulsion, as described above in the third approach. Reference samples 96-1, 96-4, 96-5, and 96-8 were prepared by mixing the polymer stabilizer into pre-manufactured emulsions, then bentonite clay slurry was added into these emulsions, as described above in the second approach.

TABLE 9

Post-Addition of Bentonite to Additional Emulsions

| Reference No. | 96-1 | 96-4 | 96-5 | 96-8 | 96-9 |
|---|---|---|---|---|---|
| Emulsion A, % | 70 | 70 | — | — | — |
| Emulsion B, % | — | — | 71 | 70 | 70 |
| Bewoten C410, % | — | 0.93 | — | 0.8 | 0.8 |
| 7.5% Bentonite Slurry, % | 30 | 30 | 29 | 30 | 30 |
| Stability | Breakage overnight | Stable, minor grains | Breakage overnight | Stable, minor grains | Stable, minor grains |

The data in Table 9 indicates that cationic slow-setting emulsions made with emulsifier combination of REDICOTE® E-11E and REDICOTE® E-7000 are not compatible with bentonite clay, but post-addition of polymer stabilizer BEWOTEN® C410 into these emulsions made them compatible to extremely water swelling bentonite clay. Alternatively, BEWOTEN®C410 can be used to treat bentonite clay so that these emulsions are compatible to the treated clay (as done in reference sample 96-9).

TABLE 10

Post-Addition of Bentonite to Additional Emulsions

| Reference No. | 2-4 | 2-3 | 3-3 | 3-4 |
|---|---|---|---|---|
| Emulsion C, % | 70 | 76 | — | — |
| Emulsion D, % | — | — | 73 | 71 |
| Bewoten C410, % | — | 1.0 | — | 1.2 |
| 7.5% Bentonite Slurry, % | 30 | 24 | 27 | 29 |
| Stability | Breakage <5 minutes | Stable, minor grains | Breakage <5 minutes | Stable, thin, smooth |

The data in Table 10 indicates that cationic rapid-setting emulsions made with REDICOTE® E-16 or REDICOTE® EM44A are not compatible to bentonite clay. Post addition of polymer stabilizer BEWOTEN® C410 into these emulsions made it compatible to extremely water swelling bentonite clay. Meanwhile, BEWOTEN® C410 can also be mixed with bentonite clay and the resulting clay is compatible to the CRS-2P emulsion (as done in reference sample 3-4). Modification of these emulsions by polymer stabilizer BEWOTEN® C410 through post-addition results in these emulsions being compatible to bentonite clay.

Example 9. Emulsifier/Polymer Concentrated Compositions

The following emulsifier concentrates were prepared from mixtures of polymer stabilizer and existing commercial emulsifier. The mixtures were simply blended, and the resulting emulsifier concentrates resulted in uniform and stable compositions. The emulsifier concentrates are stable at basic, acidic and neutral pH conditions. The amount of each ingredient in Table 11 represents the mixing ratio (by weight) of each ingredient compared to 1 unit of tap water.

TABLE 11

Concentrated Emulsifier/Polymer Compositions

| Reference No | Conc. A | Conc. B | Conc. C | Conc. D |
|---|---|---|---|---|
| Redicote ® E-7000 | 4 | 8 | 8 | 8 |
| Eka ATC 4350 | 1 | 2 | 2 | 2 |
| Tap water | 1 | 1 | 1 | 0.5 |
| Concentrated HCl | 0.06 | 0.1 | — | — |
| 50% NaOH solution | — | — | 0.04 | — |

These concentrated compositions can be utilized by an end-user at point of use to formulate a cationic emulsion composition containing additional components (such as bitumen materials) of the end-user's choosing.

As illustrated by the Examples herein, the cationic emulsions with polymer stabilizers are compatible with minerals, such that minerals can be post-added to pre-manufactured emulsions as mineral powder or slurry and form a stable mixture with long storage ability. The minerals also can be added through soap solution during preparation of the emulsions. Some of the minerals, especially water-swelling minerals, are added into cationic emulsions as part of the soap solution during emulsion production.

Advantageously, the polymer stabilizers enable lower dosages of emulsifiers for emulsion preparation and the resulting emulsions show unexpectedly better stability and less settlement or creaming than those emulsions prepared without the polymer stabilizers, particularly for emulsions made from hard base bitumen materials. Not wishing to be bound by theory, it is believed that the addition of the polymer stabilizers minimize the adsorption of emulsifiers to mineral surface and thereby avoid or reduce emulsion breakage. It is further believed that the addition of the polymer stabilizers helps disperse both mineral particles and emulsion particles to reduce settlement or creaming and to improve the storage ability of cationic emulsions.

Unexpectedly, the cationic emulsions made with polymer stabilizers through soap solutions (including slow-setting, medium-setting, and rapid-setting emulsions) give smaller particle size of the emulsion particles than the bitumen emulsions made without polymer stabilizers. The cationic bitumen emulsions made with polymer stabilizers also give relatively higher viscosity than the bitumen emulsions made without polymer stabilizers.

It is believed that the results illustrated in the various Examples herein related to bitumen emulsions would be exhibited equally in other types of oil-in-water emulsions as well.

All documents cited in the Detailed Description of the Invention are, in relevant part, incorporated herein by reference; the citation of any document is not to be construed as an admission that it is prior art with respect to the present disclosure.

While particular embodiments of the present disclosure have been illustrated and described herein, the invention is not intended to be limited to the details shown. Rather, various modifications may be made in the details within the range and scope of equivalents of the claims and without departing from the spirit and scope of the invention.

The invention claimed is:

1. A bitumen-in-water emulsion composition comprising at least one bitumen material, at least one polymer stabilizer, at least one emulsifier, and water,
   wherein the emulsifier is selected from a group consisting of cationic surfactants, amphoteric surfactants, and combinations and mixtures thereof,
   wherein the polymer stabilizer comprises a cross-linked cationic polymer resulting from polycondensation of dimethylamine, epichlorohydrin, and ethylenediamine.

2. The bitumen-in-water emulsion of claim 1 further comprising at least one mineral selected from the group consisting of bentonite, montmorillonite, illite, kaolinite, muscovite, chlorite, and combinations and mixtures thereof.

3. The bitumen-in-water emulsion composition of claim 1 wherein the emulsifier is a cationic surfactant and is a primary, secondary, or tertiary alkyl amine or alkyl polyamine having an alkyl chain containing between 4 and 40 carbon atoms.

4. The bitumen-in-water emulsion composition of claim 1 wherein the emulsifier is a cationic surfactant selected from the group consisting of saturated alkyl amine, saturated alkyl amine derivatives, unsaturated alkyl amines, unsaturated alkyl amines derivatives, saturated alkyl polyamines, saturated alkyl polyamine derivatives, unsaturated alkyl polyamines, unsaturated alkyl polyamine derivatives and combinations and mixtures thereof.

5. The bitumen-in-water emulsion composition of claim 1 wherein the emulsifier is a cationic surfactant and is selected from the group consisting of alkoxylated alkyl amines, alkyl quaternary ammonium salts, alkyl amine oxides, and combinations and mixtures thereof.

6. The bitumen-in-water emulsion composition of claim 1 wherein the emulsifier is a cationic surfactant and is selected from the group consisting of fatty amines, fatty amine derivatives, and combinations and mixtures thereof.

7. The bitumen-in-water emulsion composition of claim 1 wherein the emulsifier is an amphoteric surfactant selected from the group consisting of alkyl polyamine betaines, alkylamido polyamine betaines, and combinations and mixtures thereof.

8. The bitumen-in-water emulsion composition of claim 1 wherein the emulsifier is present in the composition at a concentration in the range of about 0.01% to about 5%.

9. The bitumen-in-water emulsion composition of claim 1 wherein the polymer stabilizer is present in the composition at a concentration in the range of about 0.01% to about 5%.

10. The bitumen-in-water emulsion composition of claim 1, wherein the bitumen material comprises modifiers selected from the group consisting of polymers, ground tire rubber, adhesion promoters, phosphoric acid, poly phosphoric acid, sulfur, wax, and combinations and mixtures thereof.

11. A method for applying pavement to a surface by contacting said surface with a mixture of aggregate and bitumen-in-water emulsion composition or an aqueous medium comprising said bitumen-in-water emulsion composition, according to claim 1.

12. An additive composition suitable for use with a mixture of bitumen material and aggregates, the additive composition comprising from about i) 10 to 50% by weight of a natural or synthetic cationic polymer comprising a cross-linked cationic polymer resulting from polycondensation of dimethylamine, epichlorohydrin, and ethylenediamine, and combinations and mixtures thereof, and ii) from about 50 to 90% of a cationic or amphoteric surfactant, wherein the additive composition improves the stability of the mixture of bitumen material and aggregates and renders the mixture compatible with mineral selected from the group consisting of bentonite, montmorillonite, illite, kaolinite, muscovite, chlorite, and combinations and mixtures thereof.

* * * * *